United States Patent [19]

White

[11] Patent Number: 5,004,017

[45] Date of Patent: Apr. 2, 1991

[54] PIPE STABILIZING SYSTEM FOR UNDERWATER USE IN JOINING FLANGED PIPE SECTIONS

[76] Inventor: Loran L. White, 629 E. School St., Lake Charles, La. 70605

[21] Appl. No.: 724,511

[22] Filed: Apr. 18, 1985

[51] Int. Cl.[5] .............................................. F16L 1/04
[52] U.S. Cl. .................................. 138/106; 285/24; 285/27; 405/154; 405/170; 29/272; 29/464
[58] Field of Search ...................... 138/106, 104, 105; 405/169, 170, 154; 414/747, 910; 29/464, 237, 271, 272; 285/5, 6, 24, 27, 32, 84, 96; 269/43

[56] References Cited

U.S. PATENT DOCUMENTS

| | | | |
|---|---|---|---|
| 1,869,778 | 8/1932 | Roberts | 405/170 |
| 3,162,469 | 12/1964 | Shohan | 285/24 |
| 3,603,617 | 9/1971 | Lochridge | 405/170 |
| 3,656,309 | 4/1972 | Bultema | 405/170 |
| 3,866,951 | 2/1975 | DeLoach | 285/5 |
| 4,016,637 | 4/1977 | Swensen | 27/272 |
| 4,051,688 | 10/1977 | Ells et al. | 405/170 |
| 4,052,045 | 10/1977 | Shaddix | 269/43 |

Primary Examiner—Henry J. Recla
Assistant Examiner—Glenn T. Barrett
Attorney, Agent, or Firm—C. Emmett Pugh

[57] ABSTRACT

A stabilizing system for use in joining flanged pipe sections together in an underwater environment including at least one flange stabilizing element having a back plate portion with a support portion affixed thereto and extending orthogonally out therefrom a distance substantially in excess of the thickness of one flange, providing laterally spaced lines of support adjacent to the front of the flange at different vertical positions along its width defining a curved support tray area consistent with the curvature of the flanges of the pipe sections to be joined. At least one stub also extends orthogonally out from said back plate portion having a diameter less than the diameter of the bolt holes of the flanges. A series of left and right flange stabilizing elements are placed on the flange of the first pipe section with their back plate portions against the backside of the flanges with the stubs extending through selected ones of the bolt holes of the flange, with the support portion extending out substantially past the flange forming a tray upon which the flange of the other pipe section can be placed for support and proper mating positioning. The back plate portion also preferably includes a circular opening aligned with a flange bolt hole, through the combination of which is placed a locking key with downwardly extending, vertically disposed ends, effectively temporarily locking the respective stabilizing element to the first pipe flange. The system is particularly useful in making up underwater connections between pipe sections, even in rough water, using one or more divers with the stabilizing tray preventing the other flanged pipe section from moving around without restriction, assisting the divers in making up the flanged pipe sections. Once the flange sections are partially made up or joined together with for example two or more loosely fastened bolts, the flange stabilizing element(s) and locking key(s) are removed, and the flange sections completely made up with the standard "O" ring(s) and bolts.

7 Claims, 4 Drawing Sheets

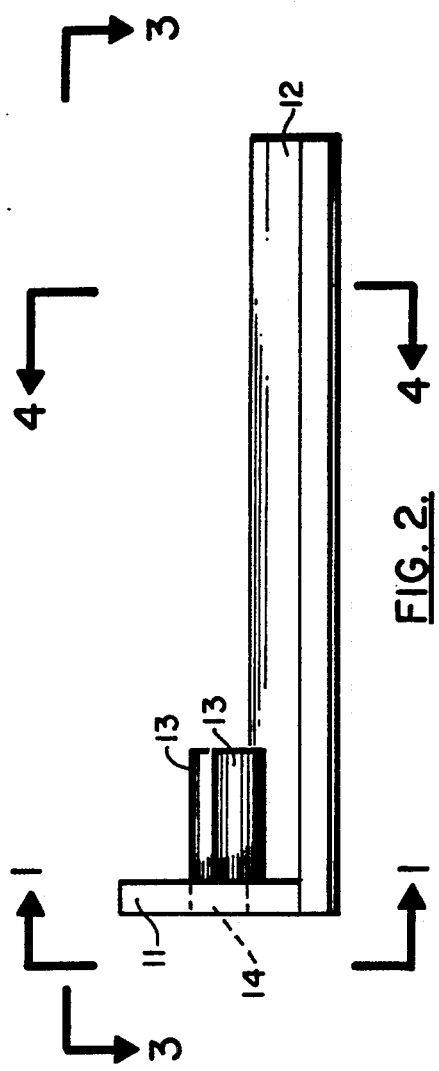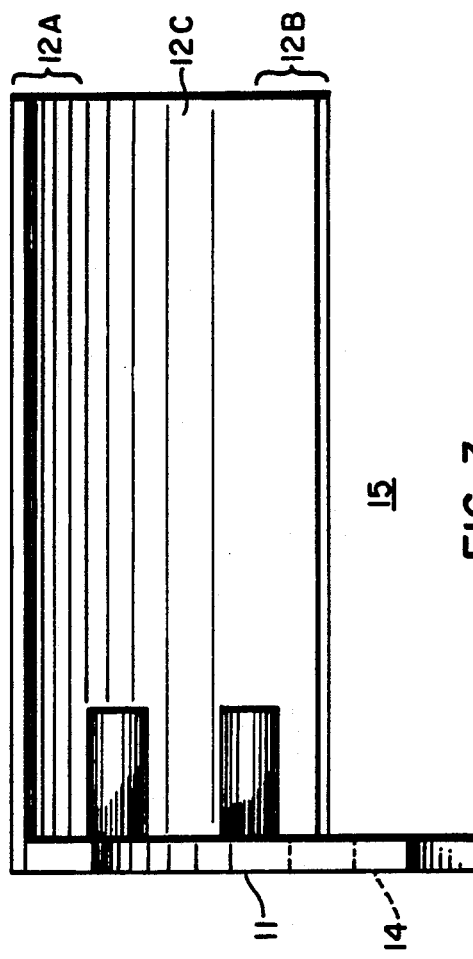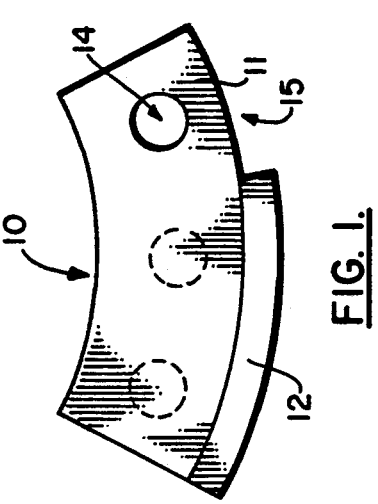

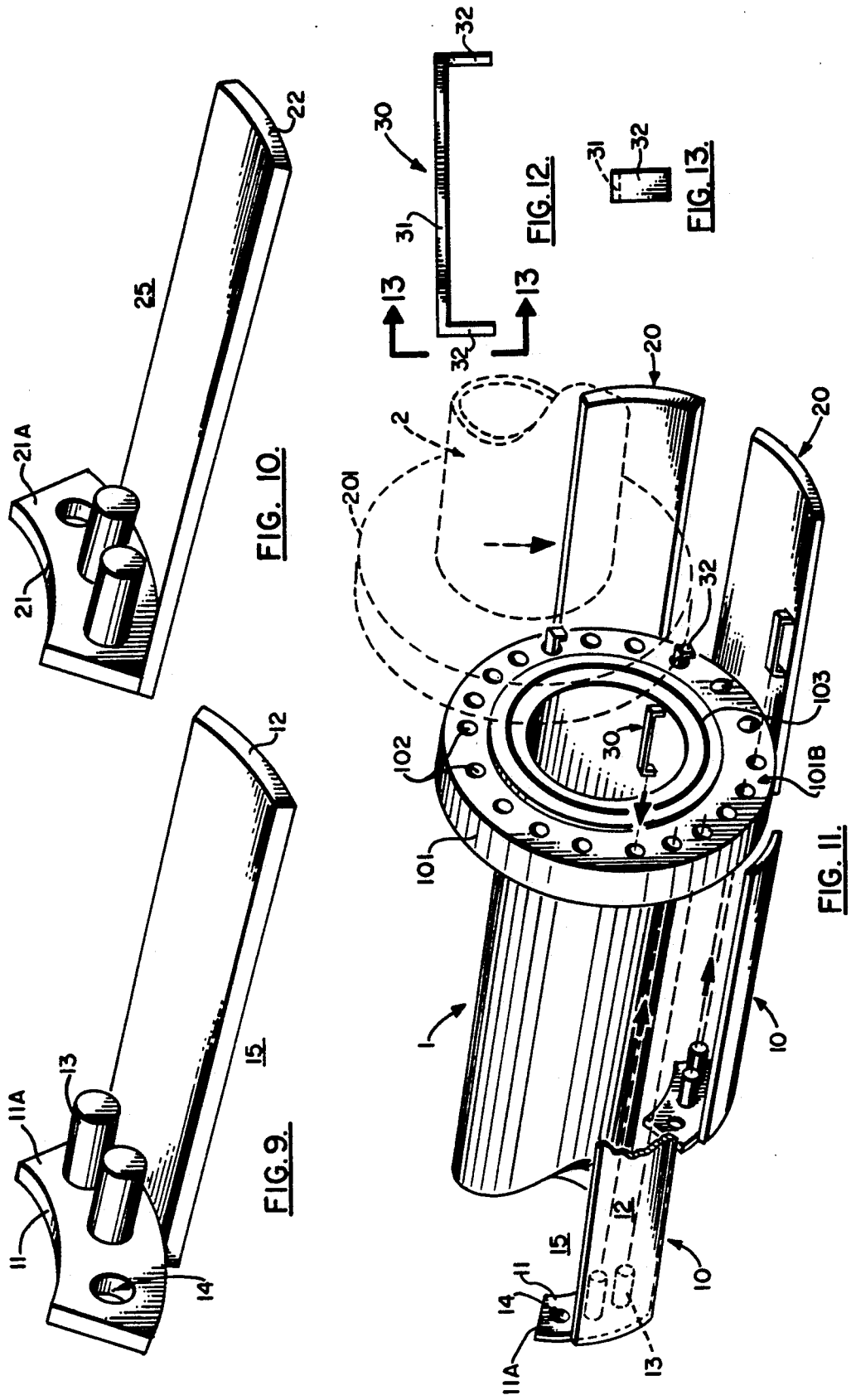

PIPE STABILIZING SYSTEM FOR UNDERWATER USE IN JOINING FLANGED PIPE SECTIONS

BACKGROUND OF INVENTION

1. Field of Invention

The present invention relates to a stabilizing system for assistance in joining up two flanged pipe sections in an underwater environment, which system includes the use of a flange stabilizing element having for example a back plate portion with a lower, flange support portion extending outwardly therefrom to form a support tray for the flange of the other pipe section, which stabilizing element is temporarily used during the initial stages of relatively positioning the pipe sections and loosely making up some of the bolts between the flanges of the pipe sections.

2. Prior Art and General Background

Heretofore, a substantial problem has existed in the joining of two flanged pipe sections in an underwater environment. In such an environment, one or more divers are used to position the flanges of the pipe sections to be joined down on the water bottom with the assistance of a crane barge floating on the water surface, using a support cable and a belly-line going from the crane(s) or air tuggers down to and supporting the pipe section to be joined to the previously positioned pipe section.

In the past, rough areas, bending of the cable supported pipe sections and the great relative weights of the pipe sections made the positioning and alignment of the flanges a very difficult step for the divers to perform. Indeed, due for example to bad weather conditions, the work could not be done and a pipe joining job could be substantially delayed at tremendous equipment and personnel costs awaiting the right conditions for the diver(s) to be able to make up and join the pipe sections.

In the past, in a valve assembly tie-in situation, a saddle clamp has been used attached at its base to a previously existing pipe line to position and hold the main body of one of the pipe sections to be joined. However, this approach has not been found to be satisfactory or reliable, particularly in rough water conditions.

The present invention is directed to providing a temporary pipe stabilizing system using one or more flange stabilizing elements positioned on one of the pipes, preferably its flange, to provide an adjacent guiding and support surface(s) for the other pipe section, preferrably its flange, during the initial make-up stages of joining the pipe sections together.

It is thus an object of the present invention to provide a safe, reliable and effective system for allowing the relatively easy joining of two pipe sections together, particularly in the difficult circumstances involved in an underwater environment, even during rough weather conditions.

3. General Discussion of the Invention

The pipe flange stabilizing system for use in joining flanged pipe sections together, particularly in an underwater environment, includes the use of at least one flange stabilizing element preferably having a back plate portion with a support portion affixed thereto and extending orthogonally out from the back plate portion a distance substantially in excess of the thickness of one flange. Additionally, there is included preferably at least one or preferably at least two stubs also extending orthogonally out from the back plate portion in the same direction as the support portion. The support portion preferably forms a support and positioning surface or tray for the underside of the flange of the other pipe section to be joined to the initial pipe section, while the stub(s) temporarily affix the flange stabilizing element to the first one of the flanges.

Additionally, to further secure the flange stabilizing element(s) to the initial flange, a locking key is preferably included for each element to temporarily lock the stabilizing element to the initial flange. This locking key can for example have the form of an extended member having at its terminal ends downwardly extending arms for hooking over the combined thicknesses of the back plate portion having a circular opening therein and the thickness of the flange, with the locking key then being inserted in the common openings formed with and between the back plate opening and an aligned bolt opening in the initial flange.

The present invention is used to stabilize or steady one pipe flange opposite the other, so that the flanges thereafter can then be relatively easily made up, including the ultimate placement of all the bolts and "O" rings.

At least one and preferably at least two spaced flange stabilizing element(s), and also preferably at least two stabilizing elements on each side of the vertical flange center-line, are used on the initial flange. The support surfaces extending out past the initial flange toward the other pipe section are then used as support, guidance and positioning means for the flange of the other pipe section. After the two mating flanges are initially made up, the stabilizing element(s) are removed, and the making up of the flanges is completed.

Since the flanges of the pipe sections are round, the tray(s) are constructed to provide a supporting contour compatible or consistent with, if not identical to, the peripheral curve of the flanges.

The stub(s) serve to position the stabilizing element on the initial flange and hold it in position on the initial flange against forces directed in the vertical plane. The locking key resists forces applied in the horizontal plane, as well as the vertical plane.

The present invention provides a simple, reliable, safety enhancing, economical system for assisting in the initial making up of two flanged pipe sections in an underwater environment, even in rough seas. It further substantially reduces the amount of "down time" or "waiting time" which would otherwise occur in offshore environments using the techniques of the prior art.

BRIEF DESCRIPTION of the DRAWINGS

For a further understanding of the nature and objects of the present invention, reference should be had to the following detailed description, taken in conjunction with the accompanying drawings in which like parts are given like reference numerals and wherein:

FIG. 1 is a rear end view of the perferred embodiment of the left flange stabilizing element, two of which are used in the preferred embodiment of the flange stabilizing system of the present invention, with the perspective being that taken from perspective lines 1—1 of FIG. 2.

FIG. 2 is a side view of the left flange stabilizing element of FIG. 1.

FIG. 3 is a plan or top view of the left flange stabilizing element of FIG. 1, with the perspective being that taken from perspective lines 3—3 of FIG. 2.

FIG. 4 is a front end, cross-sectional view of the left flange stabilizing element of FIG. 1, with the perspective being taken from perspective lines 4—4 of FIG. 2.

FIGS. 9 and 10 are perspective, front views of the left and right flange stabilizing elements of FIGS. 1 and 5, respectively.

FIG. 11 is a front perspective view of the preferred embodiment of the over-all system of the present invention, showing the flanged end of the first pipe section and, in phantom line, the flanged end of the second pipe section, with the latter being moved into its stabilized disposition (note downwardly directed direction arrow) and the left and right flange stabilizing elements and locking keys being illustrated in various stages of assembly on the flange of the first pipe section.

FIG. 12 is a side view of the preferred embodiment of the locking key used in conjunction with the left and right stabilizing elements of FIGS. 1 and 5.

FIG. 13 is an end view of the locking key element of FIG. 12, with the perspective being taken from perspective lines 13—13 of FIG. 12.

Figure 6:
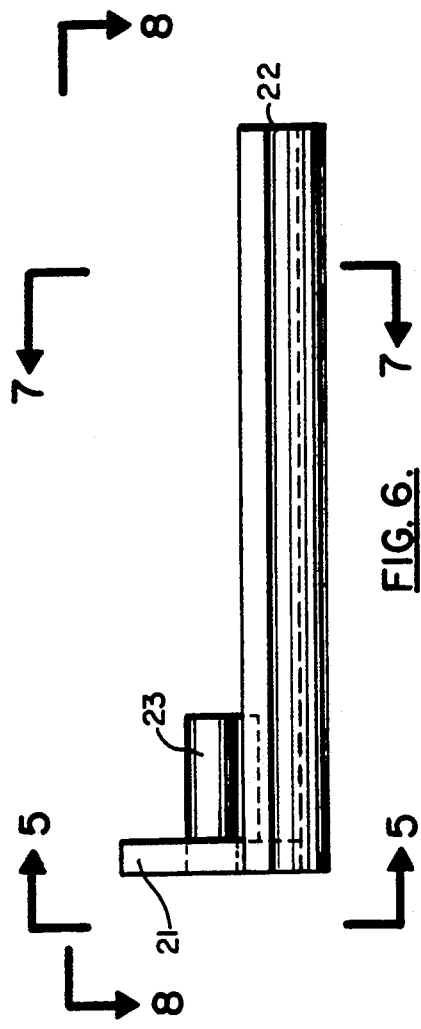
FIG. 6 is a side view of the right flange stabilizing element of FIG. 5.

DETAILED DESCRIPTION of the PREFERRED EXEMPLARY EMBODIMENT(S)

In the preferred embodiment of the pipe flange stabilizing system for use in joining two flanged pipe sections 1, 2 together down in an underwater environment, a multiple number of individual flange stabilizing elements 10, 20 are used, two left ones 10 illustrated in detail in FIGS. 1-4 and two right ones 20 illustrated in detail in FIGS. 5-8. In temporarily attaching the flange stabilizing elements 10, 20 to the flange 101 of the first pipe section 1, a locking key 30 (illustrated in detail in FIGS. 12 and 13) is used. The left and right flange stabilizing elements 10, 20 are substantively identical in the preferred embodiment, with one being the mirror image of the other from a symmetrical stand point when considered from the perspective of the vertical centerline of the illustration of FIG. 14.

As can be seen in FIGS. 1-4, the left, flange stabilizing element 10 includes a steel back plate portion 11 to which is fixedly attached by for example weldments a steel flange stabilizing portion or tray 12 extending orthogonally out from the back plate portion 11. Also extending out orthogonally from the back plate 11 is at least one, cylindrical, fixed, metal stub 13, two being included in the preferred embodiment.

Also included within the back plate 11 is a circular opening 14 having a diameter comparable to the diameter of the bolt holes 102 of the flange 101 of the first pipe section 1, with which the flange stabilizing element 10 is to be used. The lateral or peripheral spacing of the stubs 13 and the circular opening 14, as viewed from the perspectives of FIGS. 1 and 4, match the analogous, lateral, peripheral spacing of the bolt holes 102, viewed from the perspective of FIG. 14, of the flange 101.

As can best be seen in FIGS. 1, 3 and 4, the tray support portion 12 of the flange stabilizing element 10 does not extend fully across the width or arc segment of the back plate 11, leaving an open gap 15. Additionally, with reference to FIG. 3 it is noted that, although the tray support portion 12 is shown as a solid, continuous surface, it effectively provides a multitude of laterally spaced lines or areas 12A, 12B of stabilization, additional lines or areas (not enumerated) of such stabilization being provided intermediate to the end portions 12A, 12B, making up together the full continuous surface. Thus, along with for example the center line 12C of the tray portion 12, the locations 12A, 12B and 12C define a curved, stabilizing, support area consistent with the curvature of the flange 201 of the second pipe section 2, that is the degree of curvature is preferably the same as that of the periphery of the circular flange or at least reasonably consistent with providing support across an effective lateral extent of the flange 201.

As can be seen in FIGS. 5-8, the right, flange stabilizing element 20 includes a steel back plate portion 21 to which is fixedly attached by for example weldments a steel flange stabilizing portion or tray 22 extending orthogonally out from the back plate portion 21. Also extending out orthogonally from the back plate 21 is at least one, cylindrical, fixed, metal stub 23, two being included in the preferred embodiment.

Also included within the back plate 21 is a circular opening 24 having a diameter comparable to the diameter of the bolt holes 102 of the flange 101 of the first pipe section 1, with which the flange stabilizing element 20 is to be used. The lateral or peripheral spacing of the stubs 23 and the circular opening 24, as viewed from the perspectives of FIGS. 5 and 7, match the analogous, lateral, peripheral spacing of the bolt holes 102, viewed from the perspective of FIG. 14, of the flange 101.

Figure 8:
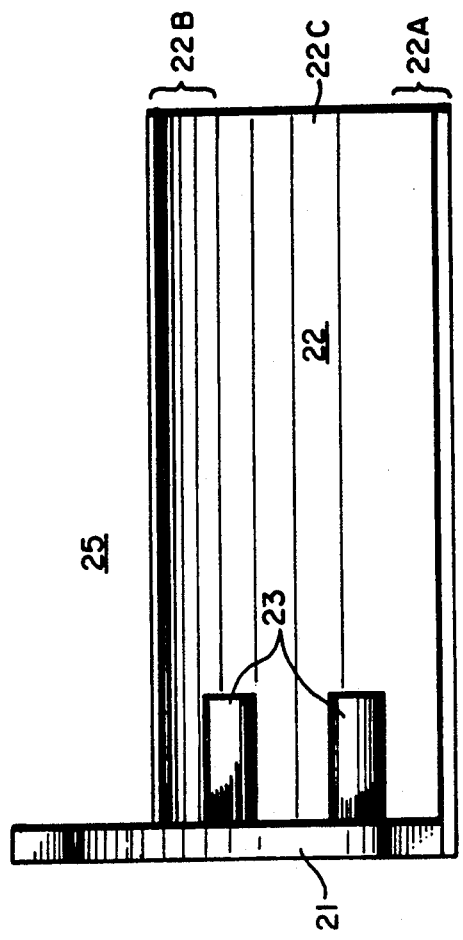
FIG. 8 is a plan or top view of the right flange stabilizing element of FIG. 5, with the perspective being that taken from perspective lines 8—8 of FIG. 6.
Figure 5:
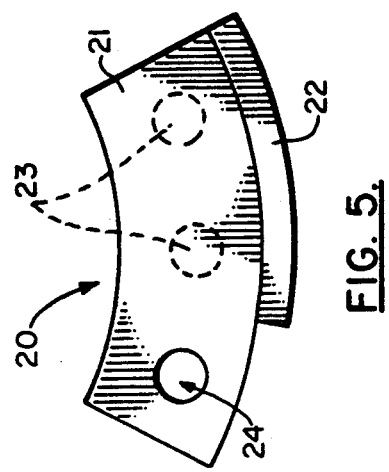
FIG. 5 is a rear end view of the preferred embodiment of the right flange stabilizing element, two of which are used in the preferred embodiment of the flange stabilizing system of the present invention, with the perspective being that taken from perspective lines 5—5 of FIG. 6.
Figure 7:
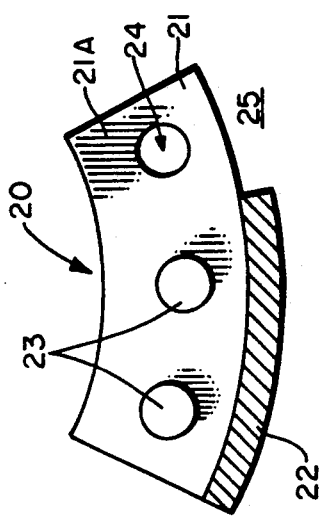
FIG. 7 is a front end, cross-section view of the right flange stabilizing element of FIG. 5, with the perspective being taken from perspective lines 7—7 of FIG. 6.

As can best be seen in FIGS. 5, 7 and 8, the tray support portion 22 of the flange stabilizing element 20 does not extend fully across the width or arc segment of the back plate 21, leaving an open gap 25. Additionally, with reference to FIG. 8 it is noted that, although the tray support portion 22 is shown as a solid, continuous surface, it effectively provides a multitude of laterally spaced lines or areas 22A, 22B of stabilization, additional lines or areas (not enumerated) of such stabilization being provided intermediate to the end portions 22A, 22B, making up together the full continuous surface. Thus, along with for example the center line 22C of the tray portion 22, the locations 22A, 22B and 22C define a curved, stabilizing, support area consistent with the curvature of the flange 201 of the second pipe section 2, that is the degree of curvature is preferably the same as that of the periphery of the circular flange or at least reasonably consistent with providing support across an effective lateral extent of the flange 201.

With reference to FIG. 11, a locking key 30 is used in conjunction with the left and right flange stabilizing elements 10, 20 in temporarily attaching them to the flange 101 of the first pipe section 1. With reference to FIGS. 12 and 13, the locking key 30 includes a central, bridging portion or main body 31 terminating in two, downwardly extended, spaced, locking arms 32. The length of the bridging portion 31 is based on being at least a little bit greater than the thickness of the flange 101 combined with the thickness of the back plate portion 11 (21).

Figures 14, 15:
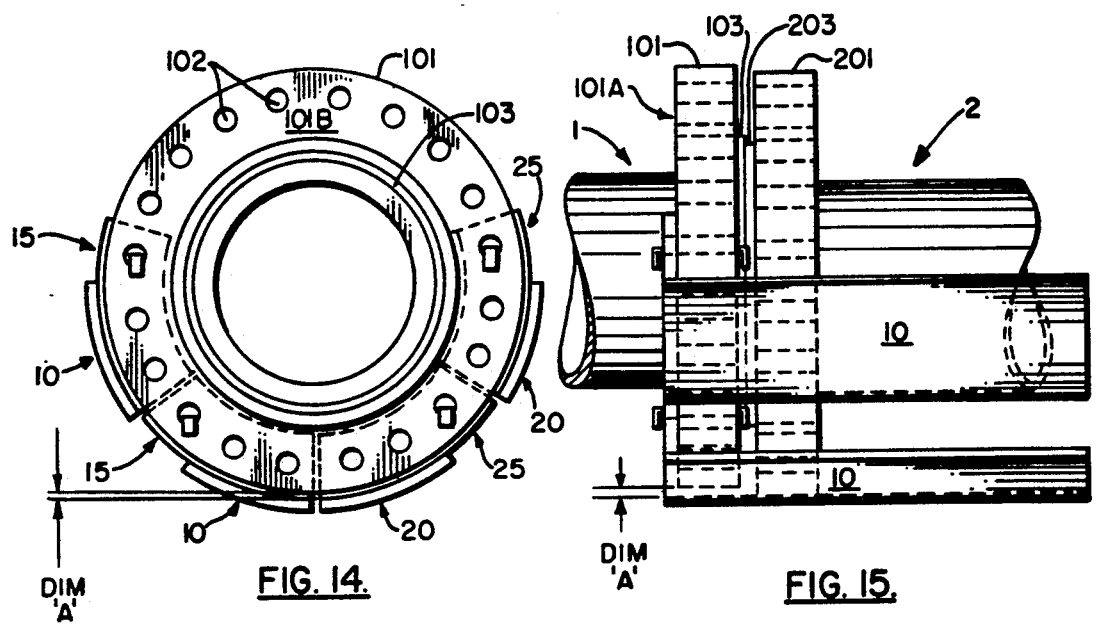
FIG. 14 is an end view of the flange end of the first pipe section showing the left and right flange stabilizing elements and locking pins fully assembled on the flange and illustrating the gap or spacing (Dim. "A") between the tray surfaces of the stabilizing elements and the corresponding adjacent edges portions of the flange.
FIG. 15 is a side view of the first and second pipe sections stabilized together in general facing relationship by means of the flange of the second pipe section (to the right in the drawing) resting on and being supported by the tray portions of the left and right flange stabilizing elements.

In use, the preferred embodiment of the over-all stabilizing system of the present invention includes on the left side two left flange stabilizing elements 10 and on the right side two right flange stabilizing elements 20, as viewed from the perspective of FIGS. 11 and 14. It is of course possible to use only a single, appropriately designed flange stabilizing element or more than two on each side or only one on each side, or each support portion could be of the relatively small width of a bar rather than the greater width illustrated, the primary purpose of the flange stabilizing element(s) being to provide laterally spaced, sufficiently strong lines of stabilization adjacent to the flange 101 of the first pipe section 1 to give adequately spaced, resistive support to the second pipe section 2, preferably directly to the flange 201. Additionally, it is further preferred that these laterally spaced lines of stabilization be provided at a different vertical position(s) than the bottom (or top) of the center point of the pipe sections 1, 2. There is thus preferably defined a curved, stabilizing area consistent, if not actually intimately mating, with the curvature of the flange 201 of the second pipe section 2.

Additionally, although it is preferred to provide the flange stabilizing elements at the bottom areas of the flanges 101, 201, in order to provide supporting tray(s) for the flange 201 of the second pipe section 2, the flange stabilizing element(s) could be provided at the top side of the pipe section which is ultimately lowered down adjacent to the facing flange of the other or initial pipe section. The primary goal is that the two flanges be relatively stabilized, positional and guided together.

Also, although the stabilizing elements are preferably connected directly to the flange 101, they could be redesigned so that they are attached to the main body of the pipe 1 back behind the flange, by for example "U" bolts or the like.

With respect to the illustrated, exemplary preferred embodiment, in use the flange stabilizing element 10, 20 are temporarily affixed to the flange 101 of the first pipe section 1 by inserting the stubs 13 (23) into and through the back sides of the flange holes 102, until the forward face 11A (21A) of the back plate 11 (21) contacts the back side 101A of the flange 101 in face-to-face, surface engagement therewith.

The stubs 13 (23) properly position the support trays 12 (22) and prevent the flange stabilizing elements 10 (20) from being knocked off due to any vertically directed forces. In order to further and more securely temporarily affix the flange stabilizing elements 10 (20) to the flange 101, the locking keys 30 are inserted through the circular openings 14 (24) and their corresponding, aligned bolt holes 102. The gaps 15, 25 allow easy access to the respective bolt holes 102 aligned with the circular openings 14, 24. After the locking keys 30 are dropped in place, the terminal, downwardly extending ends 32 effectively lock the stabilizing elements 10 (20) to the flange 101, preventing their dislodgement due to any vertically or horizontally applied forces.

After the flange stabilizing trays 10, 20 with their locking keys 30 have been completely assembled onto the flange 101 of the first pipe section 1 (all as illustrated in FIG. 14), the system is now ready for the second pipe section 2 to be lowered down into place adjacent to the first pipe section 1. As the second pipe section 2 is lowered down into place using for example a support cable from the surface typically located five to eight feet back from the flange 201, the bottom edge portions of the flange 201 come into contact with the left and right tray portions 12, 22, causing the flange 201 to be stabilized and guided into proper positioning and at least general alignment with the facing surface 101B of the flange 101 of the first pipe section 1, until the two flanges 101, 201 are contacting or nearly contacting each other in face-to-face engagement at or near the sealing "O" ring portions 103, 203 (note FIGS. 14 and 15).

With respect to FIGS. 14 and 15, it is noted that the upper, supporting surfaces of the tray portions 12, 22 are gaped or spaced downwardly or outwardly from the corresponding, adjacent, peripheral edge portions of the flange 101, a distance signified by Dim. "A" in the figures. Thus, as can be seen in FIG. 15, when the flange 201 of the second pipe section 2 is fully stabilized and positioned adjacent the flange 101 of the first pipe section 1, the flange 201 is actually a little bit lower than the flange 101 by the distance Dim. "A," which can be for example three eights of an inch.

Figure 16:
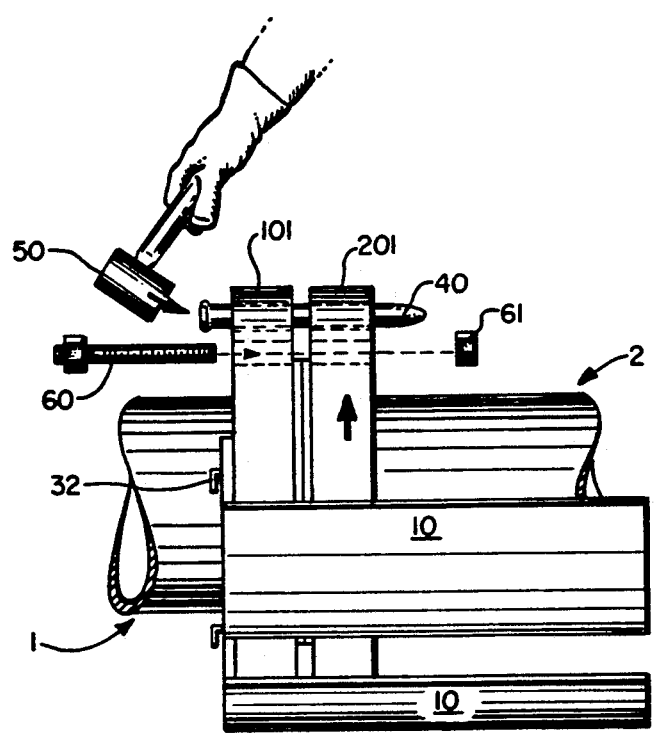
FIG. 16 is a view comparable to that of FIG. 15 but with a steel drift pin having been driven in, causing the flange of the second pipe section to be raised up (note upwardly directed direction arrow) off of the support trays of the flange stabilizing elements, and with one exemplary bolt and nut being illustrated in exploded array.

As can be seen in FIG. 16, a drift pin 40 is then inserted into one of the top, if not the top, bolt hole 102 and driven by for example a hammer 50 into the nearly directly aligned bolt hole 202 of the flange 201. This causes the flange 201 of the second pipe section to be raised upwardly (note the vertically directed direction arrow), resulting in the bottom edge of the flange 201 being moved up off of the upper, supporting surfaces of the left and right tray portions 12, 22.

At this point, or after at least some of the bolts 60 are inserted (note FIG. 16) through selected ones of the then directly aligned bolt holes 102, 202 and fastened with the nuts 61, the flange stabilizing elements 10, 20 are then disassembled and removed from the flange 101 of the pipe section 1. The locking keys 30 are easily accessible from the rear side 101A of the flange 101 (the left side from the perspective of FIG. 16), allowing them to be easily removed, with the stabilizing elements 10, 20 then merely being pulled back out so that the stubs 13, 23 are no longer located within the bolt holes 102. The fact that the bottom edge portions of the flange 201 is now raised of the support trays 12, 22 and no longer in engagement with then allows them to be easily removed without any restriction from the flange 201.

The flanged pipe sections 1, 2 are then completely made up by inserting bolts 60 into all of the bolt holes 102, 202 and fastening them into place with the nuts 61.

Upon completion, the diver(s) then return to the surface.

The foregoing system allows diver(s) to relatively easily make up flange pipe sections even when the water is rough, due to the asistance and guidance provided by the flange stabilizing element(s) 10, 20 when affixed to the flange 101 of the first pipe section 1. The system is useful whether the water is relatively shallow or deep, for example one thousand feet deep.

Exemplary dimensions for two exemplary embodiments are provided below.

Measurements for the flange stabilizing elements 10, 20 for a twelve inch 900# Series Flange could be for example:

| | |
|---|---|
| Top Width of Back Plate 11, 21 | 7¾" |
| Height of Back Plate 11, 21 | 3½" |
| Length of Tray 12, 22 | 18" |
| Width of Tray 12, 22 | 7" |
| Diameter of Stub 13, 23 | 1 5/16" |
| Length of Stub 13, 23 | 3¼" |
| Center Spacings of Stubs 13, 23 and Center of Hole 14, 24 | 3 9/32" |
| Height of Stub 13, 23 from Tray 12, 22 | 1⅛" |
| Height of Stub 13, 23 to Top of Back Plate 11, 21 | 1 5/16" |
| Diameter of Hole 14, 24 | 1⅜" |
| Back Plate 11, 21 and Tray 12, 22 Thickness | ⅜" |
| Width of Back Plate 11, 21 at Bottom | 11¼" |
| Edge of Back Plate 11, 21 to Stub 13, 23 and to Hole 14, 24 | ⅞" |

Measurements for the flange stabilizing elements 10, 20 for a twenty-four inch 900# Series Flange could be for example:

| | |
|---|---|
| Top Width of Back Plate 11, 21 | 8⅞" |
| Height of Back Plate 11, 21 | 5⅝" |
| Length of Tray 12, 22 | 20" |
| Width of Tray 12, 22 | 6" |
| Diameter of Stub 13, 23 | 2⅜" |
| Length of Stub 13, 23 | 5½" |
| Center Spacings of Stubs 13, 23 and Center of Hole 14, 24 | 5 19/32" |
| Height of Stub 13, 23 from Tray 12, 22 | 1 13/16" |
| Height of Stub 13, 23 to Top of Back Plate 11, 21 | 1⅞" |
| Diameter of Hole 14, 24 | 2¾" |
| Thickness of Back Plate 11, 21 on Hole Side | ⅜" |
| Width of Back Plate 11, 21 at Bottom | 12" |
| Edge of Back Plate 11, 21 to Stub 13, 23 | 1⅜" |
| Edge of Back Plate 11, 21 to Hole 14, 24 | 1" |
| Thickness of Tray 12, 22 and Thickness of Back Plate 11, 21 on Stub Side | 1¼" |
| Height of Hole 14, 24 from Tray 12, 22 | 1⅝" |
| Height from Hole 14, 24 to Top of Back Plate 11, 21 | 1 3/16" |

Exemplary dimensions for the locking key 30 for use with a twelve inch 900# Series Flange would be an over-all length for the main body 31 of four and three quarters inches and a width of a half inch, with a thickness for the arms 32 of a quarter inch and a length of one and a quarter inches.

Many additional variations other than those mentioned above are of course possible, and some other exemplary not exhaustive ones are as follows. The flange stabilizing elements could be for example designed to directly contact, stabilize and guide the main body of the pipe 2 right behind the flange 201, although direct flange engagement is preferred. Strengthening gussets could be added to strengthen for example the supporting trays 12, 22, or the trays be otherwise designed to assure that they provide adequate stopping or support strength to provide restrictive or resistive guidance to the second pipe section 2 as it is moved or lowered near the flanged end 101 of the first pipe section 1. Pad eyes could be included on the stabilizing elements 10, 20 for connecting cables to them for moving them to and from the water surface.

Because many varying and different embodiments may be made within the scope of the inventive concepts herein taught, and because many modifications may be made in the embodiment(s) herein detailed in accordance with the descriptive requirements of the law, it is to be understood that the details herein are to be interpreted as illustrative and not in a limiting sense.

What is claimed is:

1. A stabilizing system for use in joining flanged pipe sections together in an underwater environment, comprising:
    a first flanged pipe section located in the water a significant depth;
    a second flanged pipe section to be flanged together to said first pipe section located adjacent to said first pipe section;
    at least one flange stabilizing element attached to said first flanged pipe section, said flange stabilizing element being attached to a flange of said first pipe section, said flange stabilizing element(s) having a pipe fastening portion with a flange stabilizing portion affixed thereto and extending out from said pipe fastening portion and past said first pipe section a distance substantially in excess of the thickness of one flange, providing laterally spaced lines of stabilization adjacent to the flange of said first pipe section at a different vertical position than a bottom center-point of said first pipe section thereby defining a curved stabilizing area consistent with the curvature of a flange of said second pipe section and having sufficient strength to adequately resist movement of the flange of said second pipe section past it; said flange stabilizing portion providing means for guiding and stabilizing said second pipe section in making up the underwater connection between said pipe sections using at least one diver, the stabilizing element preventing the second flanged pipe section from moving around without restriction adjacent the flange interfaces thereby assisting the diver(s) in connecting the flanged pipe sections; said flange of said first flanged pipe section having a plurality of bolt holes in it; said pipe fastening portion including a circular opening aligned with a flange bolt hole; and there being further included a locking key with downwardly extending, vertically disposed ends inserted through said circular opening and the flange bolt hole with which it is aligned, effectively locking the stabilizing element to the flange of said first pipe section; said locking key being removable from said circular opening and the aligned bolt hole after the flanged pipe sections are connected together.

2. The system of claim 1, wherein said flange stabilizing element includes an open area at its flange stabilizing portion adjacent to said circular opening, allowing easy access to said circular opening.

3. A flange stabilizing element for use in joining a first and second flanged pipe sections together in an underwater environment, each flange of each pipe section having equally spaced peripherally located bolt holes, said flange stabilizing element comprising:

a back plate portion having a flat front face and at least one stub extending orthogonally out from said flat front face having a diameter less than the diameter of the flange bolt holes, and an opening comparable in size to a flange bolt hole, said stub(s) and said opening being laterally spaced equally to the lateral spacing of the flange bolt holes; and a support tray portion fixedly attached to a bottom portion of said back plate portion and extending orthogonally out from said back plate portion in the direction of as said stub(s), an upper side of said tray portion defining a curved surface compatible in curvature with the curvature of the flanges of the pipe sections; said support tray portion when connected to the flange of the first pipe section having sufficient strength to adequately resist movement of the flange of the second pipe section past it and being capable of providing support means for guiding and stabilizing the second pipe section in making up an underwater connection between the two pipe sections using at least one diver, the support tray portion preventing the other flanged pipe section from moving around without restriction adjacent the flange interfaces thereby assisting the diver(s) in connecting the flanged pipe sections.

4. The element of claim 3, wherein the upper side of said tray portion is spaced down a distance from a corresponding adjacent edge portion of the flange of said first pipe section; and wherein a drift pin is driven through two, facing, adjacent bolt holes of said two flanged pipe sections, causing the flange of said second pipe section to be lifted up off of the tray portion of said flange stabilizing element, allowing the easy removal of said flange stabilizing element from the flange of said first pipe section without restriction due to any engagement of said tray portion with an underside of the said flange of said second pipe section.

5. The element of claim 3, wherein said flange stabilizing element includes an open area at its support tray portion adjacent to said circular opening on said back plate portion allowing easy access to said circular opening.

6. The element of claim 3, wherein in association with said stabilizing element there is further included a locking key with downwardly extending, vertically disposed ends insertable through said circular opening on said back plate portion and the flange bolt hole with which it is aligned, effectively locking the stabilizing element to the flange of said first pipe section; said locking key being removable from said circular opening and the aligned bolt hole after the flanged pipe sections are connected together.

7. A stabilizing system for use in joining flanged pipe sections together in an underwater environment formed by a body of water, comprising:

a pair of spaced pipe sections forming a portion of a pipe line for communicating fluids therethrough located in the underwater environment, each of said sections including at a respective end a flanged end for forming a pair of spaced, flanged ends;

an intermediate pipe section having a pair of flanged ends located at respective ends for positioning between said pair of spaced, flanged ends in an abutting relationship therewith for forming said pipe line for communicating fluids therethrough;

a flange stabilizing element attached to each of said spaced, flanged ends of said spaced pipe sections for forming a pair of spaced, stabilizing elements;

a back plate portion included with each of said flange stabilizing portions and attached to a backside of each of said flanged ends of said spaced pipe sections in an abutting relationship therewith;

a tray support portion included with each of said flange stabilizing elements extending coaxially with said pipe sections and laterally from said back plate portion in a vertically spaced arrangement below said pipe sections for providing an upper surface to support said flanged end of said intermediate pipe section during a connecting operation, each of said tray supports further extending laterally from said flanged end toward each other and past a portion of said intermediate pipe section for forming a free distal end spaced vertically down from said intermediate pipe sections and included with each of said tray support portions for forming a pair of opposed, spaced tray support portions having a pair of opposed free distal ends in a spaced arrangement;

positioning means included with said spaced pipe sections and said back plate portion for positioning said tray support coaxial with said pipe sections;

locking means including an arm extending laterally from an elongated member positioned in an aligned bore through said back plate portion and said abutting flanged end of said first spaced pipe section for engaging a radially extending portion of said spaced pipe section included with said abutting flanged end, and a second arm extending laterally from said elongated member in a spaced relationship with said first arm for engaging a portion of said back plate portion for locking said tray support in a spaced arrangement coaxial with said pipe sections;

a flange stabilizing portion affixed to a pipe fastening portion extending laterally along said tray portion a distance substantially in excess of the thickness of one of said flanged ends for providing laterally spaced lines of stabilization for positioning said flanged end of said intermediate section in an adjacent abutting relationship with said flanged end of said spaced pipe sections; and a curved stabilizing area included with said flange stabilizing portion consistent with the curvature of said flanged end of said intermediate pipe section extending laterally past said abutting flanged ends in a vertically spaced arrangement with said pipe sections for providing means for guiding and stabilizing said intermediate pipe section into an abutting relationship with said flanged end of said spaced pipe sections during the connecting operation.

* * * * *